(12) United States Patent
Shinkai et al.

(10) Patent No.: US 8,016,450 B2
(45) Date of Patent: Sep. 13, 2011

(54) ILLUMINATING APPARATUS AND DISPLAY APPARATUS

(75) Inventors: Shogo Shinkai, Miyagi (JP); Shigehiro Yamakita, Miyagi (JP); Yasuyuki Kudo, Miyagi (JP); Taku Ishimori, Miyagi (JP); Eiji Ohta, Miyagi (JP); Yutaka Muramoto, Miyagi (JP)

(73) Assignee: Sony Corporation, Tokyo (JP)

( * ) Notice: Subject to any disclaimer, the term of this patent is extended or adjusted under 35 U.S.C. 154(b) by 214 days.

(21) Appl. No.: 12/539,342

(22) Filed: Aug. 11, 2009

(65) Prior Publication Data

US 2010/0039797 A1 Feb. 18, 2010

(30) Foreign Application Priority Data

Aug. 12, 2008 (JP) ................................. 2008-207864

(51) Int. Cl.
*G09F 13/04* (2006.01)
*G09F 13/08* (2006.01)
(52) U.S. Cl. ........................ 362/97.3; 362/607; 362/612
(58) Field of Classification Search ........ 362/97.1–97.4, 362/606–607, 612, 617–620; 349/64, 69
See application file for complete search history.

(56) References Cited

FOREIGN PATENT DOCUMENTS

| JP | 54-155244 | 7/1979 |
|----|-----------|--------|
| JP | 2005-326819 | 11/2005 |
| JP | 2007012517 A * | 1/2007 |

* cited by examiner

*Primary Examiner* — Jason Moon Han
(74) *Attorney, Agent, or Firm* — K&L Gates LLP

(57) ABSTRACT

An illuminating apparatus is provided and includes a plurality of point light sources in one plane and a first optical sheet and a second optical sheet overlapped in a region facing the plurality of point light sources. The plurality of point light sources are arranged in a first direction and also arranged in a second direction orthogonal to the first direction. The first optical sheet has a plurality of first three-dimensional structures extending in a direction parallel to the first direction and arranged in a direction parallel to the second direction. The second optical sheet has a plurality of second three-dimensional structures extending in a direction parallel to the second direction and arranged in a direction parallel to the first direction. Each of the second three-dimensional structures has a shape which generates a larger amount of return light from normal incident light as compared with the first three-dimensional structures.

16 Claims, 13 Drawing Sheets

| SAMPLE | UNEVENNESS CANCELLING SHEET 11 | UNEVENNESS CANCELLING SHEET 12 | H | P3/H P4/H | $T_{t1}$ | $T_{t2}$ | $T_{t1}-T_{t2}$ | $R_1/P_1$ | $R_2/P_2$ | $R_1/P_1 - R_2/P_2$ | BRIGHTNESS UNEVENNESS | DETERMINATION |
|---|---|---|---|---|---|---|---|---|---|---|---|---|
| 1 | ② | ② | 24 | 1.3 | 59 | 59 | 0 | 0.25 | 0.25 | 0 | UNSEEN | ○ |
| 2 | ③ | ③ | 24 | 1.3 | 53 | 53 | 0 | 0.20 | 0.20 | 0 | UNSEEN | ○ |
| 3 | ② | ① | 22 | 1.4 | 59 | 54 | 5 | 0.25 | 0.40 | −0.15 | STRIPES IN X DIRECTION | × |
| 4 | ② | ② | 22 | 1.4 | 59 | 59 | 0 | 0.25 | 0.25 | 0 | STRIPES IN X DIRECTION | × |
| 5 | ② | ④ | 22 | 1.4 | 59 | 43 | 16 | 0.25 | 0.175 | 0.075 | UNSEEN | ○ |
| 6 | ③ | ③ | 22 | 1.4 | 53 | 53 | 0 | 0.20 | 0.20 | 0 | STRIPES IN X DIRECTION | × |
| 7 | ③ | ④ | 22 | 1.4 | 53 | 43 | 10 | 0.20 | 0.175 | 0.025 | UNSEEN | ○ |
| 8 | ③ | ③ | 20 | 1.5 | 53 | 53 | 0 | 0.20 | 0.20 | 0 | STRIPES IN X DIRECTION | × |
| 9 | ③ | ④ | 20 | 1.5 | 53 | 43 | 10 | 0.20 | 0.175 | 0.025 | UNSEEN | ○ |
| 10 | ④ | ④ | 17 | 1.8 | 43 | 43 | 0 | 0.175 | 0.175 | 0 | STRIPES IN X DIRECTION | × |
| 11 | ④ | ⑤ | 17 | 1.8 | 43 | 36 | 7 | 0.175 | 0.125 | 0.05 | UNSEEN | ○ |
| 12 | ④ | ⑥ | 17 | 1.8 | 43 | 13 | 30 | 0.175 | 0.05 | 0.125 | STRIPES IN X DIRECTION | × |

FIG. 12

| SAMPLE | UNEVENNESS CANCELLING SHEET 11 | UNEVENNESS CANCELLING SHEET 12 | H | P₃/H P₄/H | T_{t1} | T_{t2} | T_{t1}−T_{t2} | R₁/P₁ | R₂/P₂ | R₁/P₁−R₂/P₂ | BRIGHTNESS UNEVENNESS | DETERMINATION |
|---|---|---|---|---|---|---|---|---|---|---|---|---|
| 13 | ② | ② | 30 | 1.3 | 59 | 59 | 0 | 0.25 | 0.25 | 0 | UNSEEN | ○ |
| 14 | ③ | ③ | 30 | 1.3 | 53 | 53 | 0 | 0.20 | 0.20 | 0 | UNSEEN | ○ |
| 15 | ② | ① | 27 | 1.48 | 59 | 54 | 5 | 0.25 | 0.40 | −0.15 | STRIPES IN X DIRECTION | × |
| 16 | ② | ② | 27 | 1.48 | 59 | 59 | 0 | 0.25 | 0.25 | 0 | STRIPES IN X DIRECTION | × |
| 17 | ② | ④ | 27 | 1.48 | 59 | 43 | 16 | 0.25 | 0.175 | 0.075 | UNSEEN | ○ |
| 18 | ③ | ③ | 27 | 1.48 | 53 | 53 | 0 | 0.20 | 0.20 | 0 | STRIPES IN X DIRECTION | × |
| 19 | ③ | ④ | 27 | 1.48 | 53 | 43 | 10 | 0.20 | 0.175 | 0.025 | UNSEEN | ○ |
| 20 | ③ | ③ | 23 | 1.73 | 53 | 53 | 0 | 0.20 | 0.20 | 0 | STRIPES IN X DIRECTION | × |
| 21 | ③ | ④ | 23 | 1.73 | 53 | 43 | 10 | 0.20 | 0.175 | 0.025 | UNSEEN | ○ |
| 22 | ④ | ④ | 21 | 1.9 | 43 | 43 | 0 | 0.175 | 0.175 | 0 | STRIPES IN X DIRECTION | × |
| 23 | ④ | ⑤ | 21 | 1.9 | 43 | 36 | 7 | 0.175 | 0.125 | 0.05 | UNSEEN | ○ |
| 24 | ④ | ⑥ | 21 | 1.9 | 43 | 13 | 30 | 0.175 | 0.05 | 0.125 | STRIPES IN X DIRECTION | × |

FIG. 13

| SAMPLE | UNEVENNESS CANCELLING SHEET 11 | UNEVENNESS CANCELLING SHEET 12 | | H | P3/H P4/H | Tt1 | Tt2 | Tt1 -Tt2 | R1/P1 | R2/P2 | R1/P1 -R2/P2 | BRIGHTNESS UNEVENNESS | DETERMINATION |
|---|---|---|---|---|---|---|---|---|---|---|---|---|---|
| | | SHAPE | FILLER | | | | | | | | | | |
| 25 | ③ | ③ | D | 27 | 1.48 | 53 | 51 | 2 | 0.20 | 0.20 | 0 | STRIPES IN X DIRECTION | × |
| 26 | ③ | ⑤ | D | 27 | 1.48 | 53 | 47 | 7 | 0.20 | 0.125 | 0.075 | STRIPES IN X DIRECTION | × |
| 27 | ③ | ⑥ | A | 27 | 1.48 | 53 | 50 | 3 | 0.20 | 0.05 | 0.15 | STRIPES IN X DIRECTION | × |
| 28 | ③ | ⑥ | B | 27 | 1.48 | 53 | 50 | 3 | 0.20 | 0.05 | 0.15 | STRIPES IN X DIRECTION | × |
| 29 | ③ | ⑥ | C | 27 | 1.48 | 53 | 49 | 4 | 0.20 | 0.05 | 0.15 | STRIPES IN X DIRECTION | × |
| 30 | ③ | ⑥ | D | 27 | 1.48 | 53 | 42 | 11 | 0.20 | 0.05 | 0.15 | UNSEEN | ○ |
| 31 | ③ | ⑥ | E | 27 | 1.48 | 53 | 46 | 7 | 0.20 | 0.05 | 0.15 | UNSEEN | ○ |
| 32 | ③ | ⑥ | F | 23 | 1.74 | 36 | 19 | 17 | 0.125 | 0.05 | 0.75 | UNSEEN | ○ |
| 33 | ⑤ | ⑦ | D | 27 | 1.48 | 53 | 43 | 10 | 0.20 | 0.091 | 0.109 | UNSEEN | ○ |
| 34 | ⑤ | ⑥ | G | 23 | 1.74 | 36 | 14 | 22 | 0.125 | 0.05 | 0.075 | STRIPES IN X DIRECTION | × |

FIG. 14

| FILLER | Tt' (VALUE OBTAINED WHEN AGENT IS ADDED TO FLAT TRANSPARENT PLATE HAVING THICKNESS OF 2mm) |
|---|---|
| A | 76 |
| B | 79 |
| C | 81 |
| D | 82 |
| E | 83 |
| F | 87 |
| G | 92 |

| RIDGE OF PRISM SHEET | BRIGHTNESS UNEVENNESS | DETERMINATION |
|---|---|---|
| PARALLEL TO RIDGE OF UNEVENNESS CANCELLING SHEET 12 | UNSEEN | ○ |
| ORTHOGONAL TO RIDGE OF UNEVENNESS CANCELLING SHEET 12 | STRIPES IN X DIRECTION | × |

FIG. 17

| | TOTAL LIGHT TRANSMITTANCE (%) | BRIGHTNESS | BRIGHTNESS UNEVENNESS | DETERMINATION |
|---|---|---|---|---|
| DIFFUSION PLATE 1 | 59 | 100 | UNSEEN | △ |
| DIFFUSION PLATE 2 | 66 | 100 | UNSEEN | △ |
| DIFFUSION PLATE 3 | 70 | 100 | UNSEEN | △ |
| DIFFUSION PLATE 4 | 76 | 101 | UNSEEN | ○ |
| DIFFUSION PLATE 5 | 79 | 101 | UNSEEN | ○ |
| DIFFUSION PLATE 6 | 81 | 102 | UNSEEN | ○ |
| DIFFUSION PLATE 7 | 85 | 102 | UNSEEN | ○ |
| DIFFUSION PLATE 8 | 90 | 104 | SLIGHTLY SEEN | △ |

FIG. 18

ILLUMINATING APPARATUS AND DISPLAY APPARATUS

CROSS REFERENCES TO RELATED APPLICATIONS

The present application claims priority to Japanese Priority Patent Application JP 2008-207864 filed in the Japan Patent Office on Aug. 12, 2008, the entire content of which is hereby incorporated by reference.

BACKGROUND

The present invention relates to an illuminating apparatus illuminating, for example, a transmission-type liquid crystal panel from the backside and a display apparatus having the same.

In recent years, a liquid crystal display apparatus is replacing a CRT (Cathode Ray Tube) as the mainstream of a display apparatus in related art because of its advantages such as low power consumption and smallness, lower price, and the like.

There are some types of liquid crystal display apparatuses when they are classified, for example, by methods of illuminating an image. A representative one is a transmission-type liquid crystal display apparatus displaying an image by using a light source disposed at the back of a liquid crystal panel.

In such a display apparatus, it is demanded to widen a color reproduction range. As one of the methods, it is proposed to use LEDs (Light Emitting Diodes) of three primary colors of blue, green, and red as a light source in place of a CCFL (Cold Cathode Fluorescent Lamp). It is also proposed to use LEDs of not only three primary colors but four or six primary colors in order to widen the color range.

In the case of using a CCFL or LED as the light source, it may be necessary to uniform a brightness distribution and a color distribution in a plane. When an illuminating apparatus is relatively small, a light guide plate of a side light type may be used. In the case where an illuminating apparatus is relatively large and a large light amount is necessary, a direct below type of directly arranging light sources is the mainstream. As one of methods of suppressing brightness unevenness and color unevenness in the direct below type, a method of disposing a diffusion plate, to which a filler is added, above a light source is proposed (Japanese Unexamined Patent Application Publication No. Sho54-155244). As another method, a method of using a plate having a uniform sectional shape in one direction is proposed (Japanese Unexamined Patent Application Publication No. 2005-326819).

In the case of using LEDs of three primary colors as a light source of an illuminating apparatus, as compared with the case of using a CCFL as a light source of an illuminating apparatus, it is difficult to suppress brightness unevenness and color unevenness in a plane for the following reasons. LEDs are point light sources and, while a CCFL generates white light, LEDs of three primary colors have to generate white light by mixing the three colors. For example, the invention of Japanese Unexamined Patent Application Publication No. Sho54-155244) has a problem such that, when LEDs are used as the light source, the distance from the light source to a diffusion plate may be necessary to be relatively long, and the illuminating apparatus becomes thick. On the other hand, the invention of Japanese Unexamined Patent Application Publication No. 2005-326819 has a problem such that, although the CCFL as a linear light source is valid, brightness unevenness and color unevenness occurs in LEDs as the point light sources.

It is therefore desirable to provide an illuminating apparatus realizing reduced brightness unevenness and color unevenness which occurs due to point light sources, and a display apparatus having the same.

SUMMARY

An illuminating apparatus as an embodiment includes: a plurality of point light sources disposed in one plane; and two optical sheets overlapped in a region facing the plurality of point light sources. The plurality of point light sources are arranged in a first direction and also arranged in a second direction orthogonal to the first direction. The optical sheet on the side of the point light sources has a plurality of first three-dimensional structures extending in a direction parallel to the first direction and arranged in a direction parallel to the second direction. The optical sheet on the side opposite to the point light sources has a plurality of second three-dimensional structures extending in a direction parallel to the second direction and arranged in a direction parallel to the first direction. Each of the second three-dimensional structures has a shape which generates a larger amount of return light from normal incident light as compared with the first three-dimensional structures.

A display apparatus as an embodiment has a display panel driven on the basis of an image signal, and the illuminating apparatus illuminating the display panel.

In the illuminating apparatus and the display apparatus of an embodiment, an optical sheet, in which a plurality of first three-dimensional structures extending in a direction parallel to an arrangement direction of point light sources are formed, and another optical sheet, in which a plurality of second three-dimensional structures extending in a direction parallel to another arrangement direction of the point light sources are formed, are overlapped in order from the point light sources side. Further, each of the second three-dimensional structures has a shape which generates a larger amount of return light from normal incident light more than the first three-dimensional structures. As a result, the ratio that light incident normal to the optical sheet on the side opposite to the point light sources, in light deflected by and passed through the first three-dimensional structures is reflected by the second three-dimensional structures and becomes return light travelling toward the point light sources side, becomes large.

In the illuminating apparatus and the display apparatus of an embodiment, the second three-dimensional structures have a shape which generates a larger amount of return light from normal incident light more than the first three-dimensional structures. Consequently, the ratio that light incident perpendicular to the optical sheet on the side opposite to the point light sources, in light deflected by and passed through the first three-dimensional structures is reflected by the second three-dimensional structures and becomes return light travelling toward the point light sources side may be increased. As a result, a light source division image formed by the first three-dimensional structures is cancelled by the second three-dimensional structures, so that brightness unevenness and color unevenness occurring due to the point light sources may be reduced.

Other and further objects, features and advantages of the invention will appear more fully from the following description.

Additional features and advantages are described herein, and will be apparent from the following Detailed Description and the figures.

BRIEF DESCRIPTION OF THE FIGURES

FIG. 12 is a table showing the configuration of the illuminating apparatus of the embodiment, results of measurement of brightness unevenness, and results of determination.

FIG. 13 is a table showing the configuration of an illuminating apparatus as another embodiment, results of measurement of brightness unevenness, and results of determination.

FIG. 14 is a table showing the configuration of an illuminating apparatus as another embodiment, results of measurement of brightness unevenness, and results of determination.

FIG. 17 is a correspondence diagram showing the configuration of an illuminating apparatus as further another example, a measurement result of brightness unevenness corresponding to the configuration, and a determination result.

FIG. 18 is a correspondence diagram showing various diffusion plates, total luminous transmittances [%] (JIS K 7361) of the diffusion plates, measurement results of brightness and brightness unevenness, and determination results.

DETAILED DESCRIPTION

Embodiments will be described in detail hereinbelow with reference to the drawings.

Figure 1:
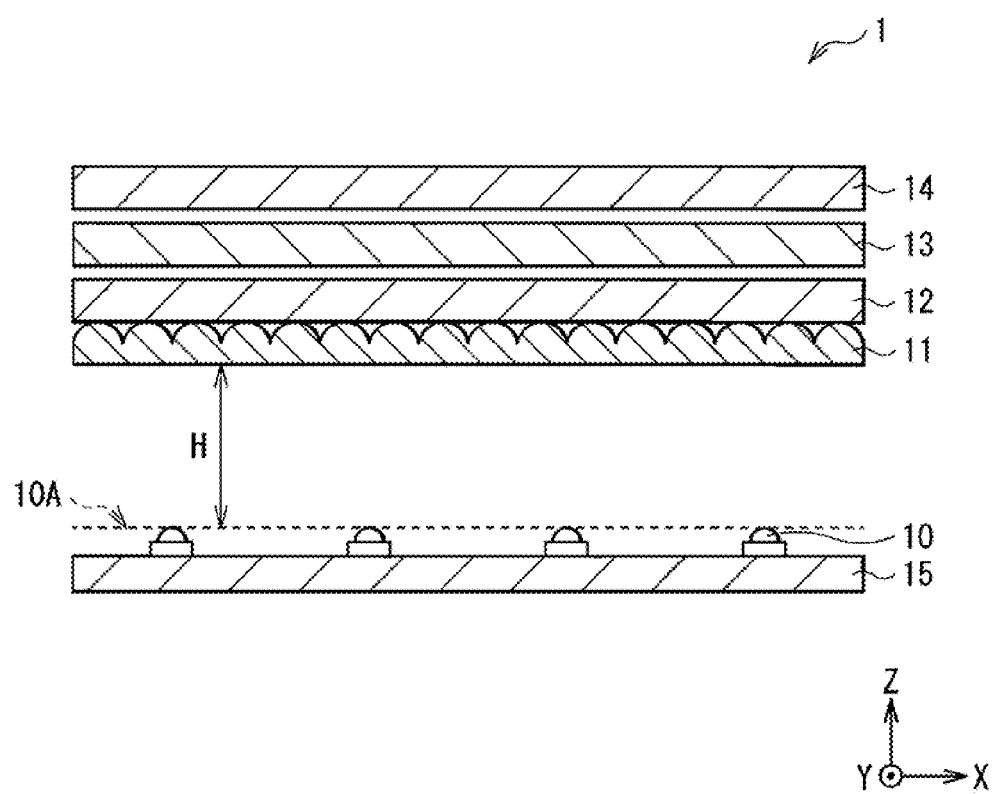
FIG. 1 is a cross section showing an example of an illuminating apparatus as an embodiment.
Figure 2:
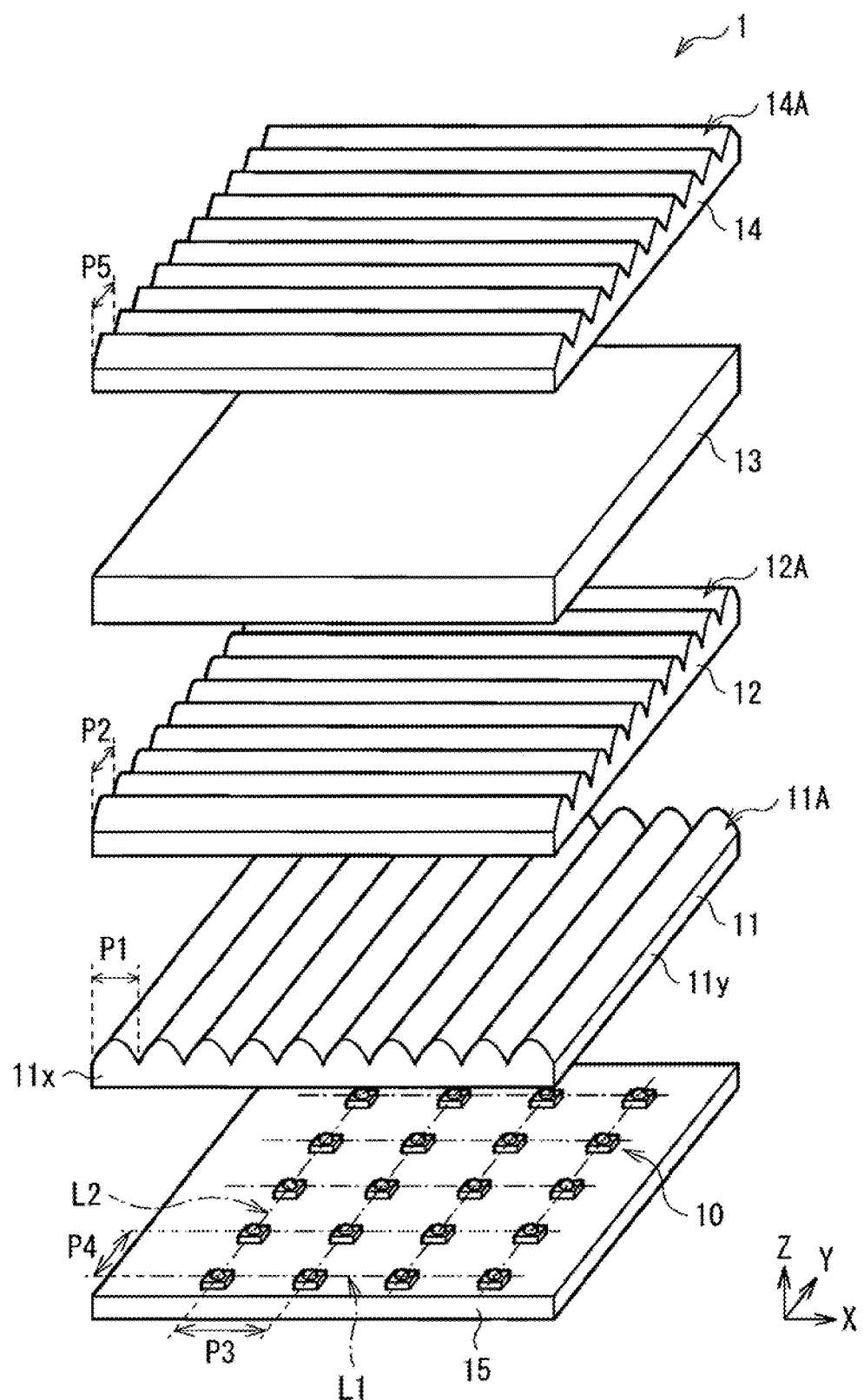
FIG. 2 is an expanded perspective view showing an internal configuration of the illuminating apparatus of FIG. 1.

FIG. 1 shows a sectional configuration of an illuminating apparatus 1 as an embodiment. FIG. 2 is an expanded perspective view of the illuminating apparatus 1 of FIG. 1.

The illuminating apparatus 1 has a plurality of point light sources 10 disposed in one face 10A, light control sheets 11 and 12 (optical sheets), a diffusion member 13, a prism sheet 14, and a reflection sheet 15. The reflection sheet 15 is disposed at the back of the point light sources 10, on the side opposite to the point light sources 10. The light control sheets 11 and 12, the diffusion member 13, and the prism sheet 14 are disposed, in this order from the point light sources 10 side, on the side opposite to the reflection sheet 15 with respect to the point light sources 10, so as to be placed opposite the point light sources 10. In the following, the point light sources 10, the diffusion member 13, the prism sheet 14, and the reflection sheet 15 will be described and, after that, the light control sheets 11 and 12 will be described.

Point Light Source 10

Each of the point light sources 10 is constructed by, for example, one or more LEDs of a single color (the same color), a single LED that emits light of red (R), green (G), or blue (B), or a plurality of LEDs that emit light of three primary colors of R, G, and B.

As shown in FIG. 2, the point light sources 10 are arranged in a direction L1 (first direction) parallel to a side 11x extending in a direction (the X-axis direction in FIG. 2) of the light control sheet 11, and are arranged in a direction L2 (second direction) parallel to a side 11y extending in a direction (the Y-axis direction in FIG. 2) orthogonal to one direction (the X-axis direction in FIG. 2) of the light control sheet 11. That is, the plurality of point light sources 10 are arranged orthogonally in a matrix.

In FIG. 2, the arrangement directions in the point light sources 10 refer to the following two directions. One is a direction of a line segment (called the direction A for convenience) connecting, in shortest distance, one point light source 10, and another point light source 10 of a plurality of point light sources 10 disposed around the one point light source 10. Here, the another point light source 10 is the closest to the one point light source 10 (when there are two or more point light sources 10 closest to the one point light source 10, one of them). The other is a direction of a line segment connecting, in shortest distance, the one point light source 10, and another point light source 10 of a plurality of point light sources 10 in a direction crossing the direction A. Here, the another point light source 10 is the closest to the one point light source 10, and the direction crossing the direction A is a direction as viewed from the one point light source 10.

In the case where each of the point light sources 10 is constructed by a single LED that emits light of R, G, or B, or a plurality of LEDs that emit light of three primary colors of R, G, and B, the arrangement directions are specified according to the above-mentioned rule by colors. Depending on the arrangement of LEDs, the line segment of arrangement may become zigzag. In this case, it may be sufficient to average zigzags to correct the zigzag line segment to a linear line.

Pitch P3 of the plurality of point light sources 10 in the direction L1 is preferably equal to pitch P4 of the plurality of point light sources 10 in the direction L2 but may be different from the pitch P4.

The pitch of the plurality of point light sources 10 refers to the interval (distance) between the neighboring point light sources 10 in the arrangement direction. In the case where each of the point light sources 10 is constructed by a single LED which emits light of R, G, or B or a plurality of LEDs which emit light of the three primary colors of R, G, and B, the pitch is specified according to the above-described rule by colors.

Diffusion Member 13

The diffusion member 13 is, for example, a thick high-rigid optical sheet having a light diffusion layer formed by dispersing a diffusion material (filler) in a relatively-thick plate-shaped transparent resin, or a thin optical sheet formed by applying a transparent resin containing a light diffusion material on a relatively-thin film-shaped transparent resin. The diffusion member 13 has the function of diffusing light from the point light sources and return light from the prism sheet 14 side. In the case where the diffusion member 13 is an optical sheet having high rigidity, it also functions as a supporting member that supports another optical sheet (for example, the light control sheets 11 and 12 and the prism sheet 14). The diffusion member 13 may be obtained by combining a member formed by dispersing a diffusion member (filler) in a relatively-thick plate-shaped transparent resin and a member formed by applying a transparent resin (binder) containing a diffusion member on a relatively-thin film-shaped transparent resin.

As the plate-shaped or film-shaped transparent resin, for example, a light-transmissive thermoplastic resin such as PET, acrylic, or polycarbonate is used. The light diffusion layer has a thickness of, for example, 1 mm to 5 mm. The light diffusion material is made of, for example, particles having an average particle diameter of 0.5 µm to 10 µm which are dispersed in a transparent resin within the range of 0.1 part by weight to 10 parts by weight in the weight of the entire light diffusion layer. Examples of the light diffusion material include an organic filler and an inorganic filler. As the light diffusion material, cavity particles may be used.

When the light diffusion layer becomes thinner than 1 mm, there is the possibility that light diffusivity is lost and sheet rigidity may not be assured at the time of supporting the diffusion member 13 by a casing (not shown). If the light diffusion layer becomes thicker than 5 mm, when the diffusion member 13 is heated by light from the light source, it becomes difficult to diffuse the heat, and the diffusion member 13 may bend. In the case where the average particle diameter of the light diffusion member is in the range of 0.5 µm to 10 µm and the light diffusion member is dispersed in the transparent resin in the range of 0.1 part by weight to 10 parts by weight in the weight of the entire light diffusion layer, the effect of the light diffusion material appears efficiently, and brightness unevenness may be solved by combination with the light control sheets 11 and 12.

Although not shown, a diffusion sheet may be provided separate from the diffusion member 13 between the diffusion member 13 and the prism sheet 14. The diffusion sheet is, for example, a thin optical sheet formed by applying a transparent resin containing the light diffusion member on a relatively-thin film-shaped transparent resin. The diffusion sheet has the function of diffusing light which passed through the diffusion member 13 and the like.

Prism Sheet 14

The prism sheet 14 is, for example, as shown in FIG. 2, a thin optical sheet in which a plurality of projections 14A extending in a direction parallel to the extending direction of projections 12A of the light control sheet 12 are arranged in a direction orthogonal to the extending direction on the top face (the surface on the light outgoing side) of the prism sheet 14. With the configuration, the prism sheet 14 deflects and transmits a component in the arrangement direction of the projections 12A in the light incident from the bottom side, toward the normal direction of the bottom face, increases the directivity, and improves on-axis brightness. In FIG. 2, the projection 12A has a triangular prism shape with a pointed apex. For example, the apex may be rounded or meandering. FIG. 2 shows the case where the projections 12A extend in the direction parallel to the extending direction of the projections 12A in the light control sheet 12. For example, although not shown, the projections 12A may extend in the direction crossing the extending direction of the projections 12A of the light control sheet 12.

The prism sheet 14 may be formed integrally by using, for example, a resin material having transparency such as one or more kinds of thermoplastic resins, or formed by transferring an energy beam (for example, ultraviolet ray) curable resin onto a transparent base material such as PET (polyethylene terephthalate).

In consideration of the function of controlling the light outgoing direction, it is preferable to use a thermoplastic resin having a refractive index of 1.4 or higher. Examples of such a resin include acrylic resins such as polycarbonate resin, and PMMA (polymethylmethacrylate resin), polyolefin resins such as polyethylene (PE) and polypropylene (PP), a polyester resin such as polyethylene terephthalate, an amorphous copolymerized polyester resin such as MS (copolymer between methyl methacrylate and styrene), polystyrene resin, polyvinyl chloride resin, cycloolefin resin, urethane resin, natural rubber resin, artificial rubber resin, and a combination of any of the resins.

Reflection Sheet 15

The reflection sheet 15 is disposed in a position on the opposite side apart from the face 10A including the plurality of point light sources 10 only by a predetermined gap, and has a reflection face on the side of the point light sources 10. The reflection face has, preferably, not only the function of specular reflection but also the function of diffuse reflection. To display the functions of normal reflection and diffuse reflection, a resin colored in white may be used for the reflection face. In this case, preferably, high ray reflection characteristic is obtained. Such a material is, for example, a polycarbonate resin, a polybutylene terephthalate resin, or the like.

Light Control Sheets 11 and 12

The light control sheet 11 is, as shown in FIG. 2, a thin optical sheet in which a plurality of projections 11A (first three-dimensional structures) extending in a direction parallel to one extending direction (direction L2) of the point light sources 10 are arranged on the top face (the surface on the light outgoing side) of the light control sheet 11. On the other hand, the light control sheet 12 is, as shown in FIG. 2, a thin optical sheet in which a plurality of projections 12A (second three-dimensional structures) extending in a direction parallel to one extending direction (direction L1) of the point light sources 10 are arranged in a direction orthogonal to the extending direction on the top face (the surface on the light outgoing side) of the light control sheet 12. That is, the extending direction of the projection 11A and that of the projection 12A are orthogonal to each other. The light control sheets 11 and 12 are made of, for example, a material common to that of the prism sheet 14. The light control sheet 12 may contain a light diffusion material.

The projection 11A has a three-dimensional structure expressing an optical characteristic of relatively easily passing incident light from the side of the point light sources 10 in relation to the projections 12A. On the other hand, the projection 12A has a three-dimensional structure expressing an optical characteristic of relatively not-easily passing incident light from the side of the point light sources 10 in relation to the projections 11A. Concretely, the projection 12A has a shape which generates a larger amount of return light from normal incident light as compared with the projection 11A.

The expression that the projection 12A generates a larger amount of return light from normal incident light as compared with the projection 11A, roughly means that total luminous transmittance [%] (JIS K 7361) of the optical sheet 12 when light is incident from the point light sources 10 side normal to the optical sheet 12, is smaller than that of the optical sheet 11 when light is incident from the point light sources 10 side normal to the optical sheet 11. This will be concretely described using numerical values, and it is almost equivalent to that the projections 11A and 12A satisfy the equations (1) and (2), and that the equation (3) is satisfied.

$$P3/H > 1.3 \qquad (1)$$

$$P4/H > 1.3 \qquad (2)$$

$$20 > Tr1 - Tr2 > 5 \qquad (3)$$

P3 denotes a pitch in the direction L1 of the point light sources 10. P4 denotes a pitch in the direction L2 of the point light sources 10. H denotes distance between the point light sources 10 and the light control sheet 11. Tt1[%] denotes total luminous transmittance of the light control sheet 11 when light is incident from the point light sources 10 side normal to the light control sheet 11. Tt2[%] denotes total luminous transmittance of the light control sheet 12 when light is incident from the point light sources 10 side normal to the light control sheet 12.

In the case where no diffusion agent such as a filler is contained in the light control sheets 11 and 12 and a diffusion plate exists on the light control sheets 11 and 12, the projections 11A and 12A may be specified as follows. The projections 11A and 12A satisfy equations (4) and (5), and satisfy equations (6) and (7).

$$P3/H > 1.3 \quad (4)$$

$$P4/H > 1.3 \quad (5)$$

$$0.1 \leq R2/P2 < R1/P1 < 0.4 \quad (6)$$

$$0.02 < R1/P1 - R2/P2 < 0.1 \quad (7)$$

Figure 3:
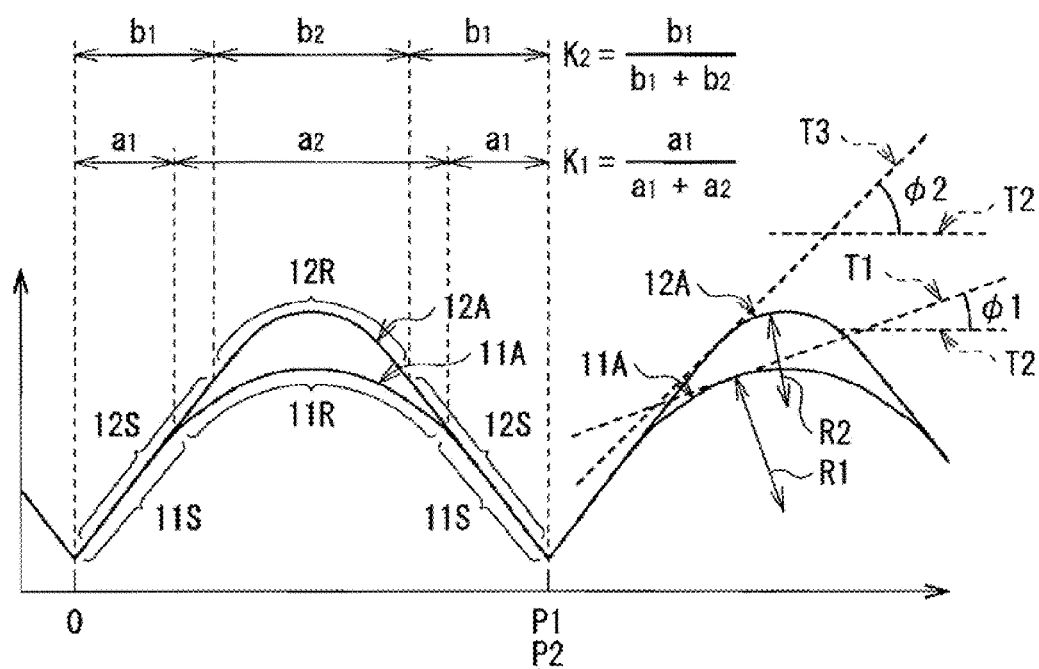
FIG. 3 is a cross section showing projections in a light control sheet in FIG. 1.

P1 denotes a pitch in the arrangement direction (X-axis direction) of the plurality of projections 11A as shown in FIG. 2. P2 denotes a pitch in the arrangement direction (Y-axis direction) of the plurality of projections 12A as shown in FIG. 2. R1 denotes a curvature of an apex 11R of the projection 11A as shown in FIG. 3. R2 denotes a curvature of an apex 12R of the projection 12A as shown in FIG. 3. FIG. 3 shows that an example of sectional shapes of the projections 11A and an example of sectional shapes of the projections 12A overlap. φ1 in FIG. 3 denotes an angle formed by a tangent line T1 which is in contact with the projection 11A and a plane T2 parallel to the rear face of the light control sheet 11. φ2 in FIG. 3 denotes an angle formed by a tangent line T3 which is in contact with the projection 12A and the plane T2 parallel to the rear face of the light control sheet 11.

When each of φ1 and φ2 is less than 39°, the ratio of the light passing through the surfaces of the projections 11A and 12A in the light incident normal to the rear face of the light control sheets 11 and 12, is dominant more than the ratio that the light is reflected by the projections 11A and 12A and becomes return light. When each of φ1 and φ2 exceeds 59°, although the light perpendicularly incident on the rear face of the light control sheets 11 and 12 is totally reflected by a surface of the projections 11A and 12A, it may not happen that the reflection light passes through another surfaces of the projections 11A and 12A and the transmission light is again incident on the projections 11A and 12A. Consequently, in this case as well, the ratio of the light passing through the light control sheets 11 and 12 in the light incident normal to the rear face of the light control sheets 11 and 12 is dominant more than the ratio that light is reflected by the light control sheets 11 and 12 and becomes return light.

The upper and lower limits in the equations (4) and (5) are specified by the unevenness ratio obtained by the following equation (6) and are specified in the range in which the unevenness ratio does not exceed 3%. The unevenness ratio of 3% is the upper limit at which a person may not visually recognize display unevenness (or may ignore display unevenness) and is one of indexes in display quality.

$$\text{Unevenness ratio (\%)} = ((\text{maximum brightness} - \text{minimum brightness})/\text{average brightness}) \times 100 \quad (6)$$

It is preferable that φ1 smoothly increases from the apex part of the projection 11A to the bottom thereof and that φ2 smoothly increases from the apex part of the projection 12A to the bottom thereof. For example, in the case where the projection 11A has, as shown in FIG. 3, a three-dimensional structure of a triangular prism having the apex 11R extending in the direction parallel to one extending direction (direction L2) of the point light sources 10 and having, on both sides of the apex 11R, tilted surfaces 11S smoothly continued to the apex 11R, preferably, the apex 11R has a shape projected toward the light outgoing side and the tilted surfaces 11S are flat faces. For example, in the case where the projection 12A has, as shown in FIG. 3, a three-dimensional structure of a triangular prism having the apex 12R extending in the direction parallel to one extending direction (direction L1) of the point light sources 10 and having, on both sides of the apex 12R, tilted surfaces 12S smoothly continued to the apex 12R, preferably, the apex 12R has a shape projected toward the light outgoing side and the tilted surfaces 12S are flat faces.

In the case where the projections 11A and 12A have the three-dimensional structures as shown in FIG. 3, when the tilt angles of the tilted surfaces 11S and 12S are equal to each other, naturally, the height of the apex 11R is larger than that of the apex 12R.

The projections 11A and 12A are not limited to the shapes described above but may be modified as long as the equations (1) to (5) are satisfied.

The ratio of a return light generating part a1 (first part) that generates return light toward the point light sources 10 side by totally reflecting light incident normal to the light control sheet 11 from the point light sources 10, occupying the projection 11A when the light control sheet 11 is seen from the normal direction of the face 10A, is set to K1. The ratio of a return light generating part b1 (second part) that generates return light toward the point light sources 10 side by totally reflecting light incident normal to the light control sheet 12 from the point light sources 10, occupying the projection 12A when the light control sheet 12 is seen from the normal direction of the face 10A is set to K2. In this case, K2 is preferably larger than K1.

For example, when the projection 11A has a three-dimensional structure as shown in FIG. 3, the return light generating part a1 corresponds to the tilted surface 11S, and the part a2 other than the return light generating part a1 in the projection 11A corresponds to the apex 11R. For example, when the projection 12A has a three-dimensional structure as shown in FIG. 3, the return light generating part b1 corresponds to the tilted surface 12S, and the part b2 other than the return light generating part b1 in the projection 12A corresponds to the apex 12R. Depending on the tilt angles and the surface shapes of the tilted surfaces 11S and 12S and the surface shapes of the apexes 11R and 12R, the corresponding relations as described above may not be always satisfied.

The action and effect of the illuminating apparatus 1 of the embodiment will now be described.

In the illuminating apparatus 1 of the embodiment, brightness unevenness in light emitted from the point light sources 10 is reduced by the light control sheets 11 and 12. The resultant light is diffused by the diffusion member 13 so that directivity is lessened. Then, the light is condensed by the prism sheet 14, and the on-axis brightness and directivity are adjusted.

In the embodiment, the light control sheet 11 in which the plurality of projections 11A extending in the direction parallel to the one arrangement direction (L2) of the point light sources 10, and the light control sheet 12 in which the plurality of projections 12A extending in the direction parallel to the other arrangement direction (L1) of the point light sources 10, are overlaid in order from the side of the point light sources 10. With the configuration, the brightness unevenness in the direction parallel to the arrangement direction L1 of the point light sources 10 in the light emitted from the plurality of point light sources 10 may be lessened by the light control sheet 11. The brightness unevenness in the direction parallel to the arrangement direction L2 of the point light sources 10 may be lessened by the light control sheet 12.

The light incident on the rear face of the light control sheet 11 is almost linear light, and the light incident on the light control sheet 12 is diffusion light scattered by the light control sheet 11. To make the amount of return light in the direction (X direction) parallel to the arrangement direction L1 of the point light sources 10 and the amount of return light in the direction (Y direction) parallel to the arrangement direction L2 of the point light sources 10 equal to each other, the capability of generating return light in the light control sheet 12 may be requested to be higher than the capability of generating return light in the light control sheet 11. Consequently, in the case where the capabilities are the same (typically, in the case where the shape and the material of the projections 11A in the light control sheet 11 are the same as those of the projections 12A in the light control sheet 12), the light control effect of the light control sheet 11 having a larger amount of linear incident light is higher than that of the light control sheet 12 having a smaller amount of the linear incident light. As a result, a phenomenon such that unevenness only in the X direction is cancelled and unevenness in the Y direction remains, or a phenomenon such that the portion over the point light sources 10 only in the X direction becomes abnormally dark occurs.

On the other hand, in the embodiment, the projections 12A in the light control sheet 12 have a three-dimensional structure with the light directing action relatively stronger than that of the projections 11A in the light control sheet 11 (that is, satisfying the equations (1) to (5)), and have a shape that generates a larger amount of return light from normal incident light. With the shape, the light control effect of the light control sheet 11 and that of the light control sheet 12 may be made almost equal to each other. Therefore, the phenomenon such that unevenness only in the X direction is cancelled but unevenness in the Y direction remains, or the phenomenon such that the portion over the point light sources 10 only in the X direction becomes abnormally dark may be prevented. Brightness unevenness and color unevenness caused by the point light sources 10 may be reduced.

In the embodiment, in the case where a light diffusing agent is contained in the light control sheet 12, by the scattering effect of the light diffusing agent, the brightness unevenness and color unevenness caused by the point light sources 10 may be reduced. Preferably, the additive amount of the light diffusing agent is a minute amount. For example, in the case where the light diffusing agent is contained in a transparent plate which is formed by using the same resin materials as the optical sheet on the side opposite to the point light sources and which has a thickness of 2 mm and whose both faces are flat, preferably, the total luminous transmittance (JIS K 7361) when light is normally incident on the transparent plate to which the light diffusing agent is added, lies in the range from 81% to 87%. In this case, the upper limit value is the limit value of the total luminous transmittance [%] in the transparent plate, and the lower limit value is a value specified as an amount of a degree at which, in the case where three-dimensional shapes are provided in the surface of the transparent plate, the return light generating effect is not largely disturbed by addition of the light diffusing agent (refer to FIG. 14 described later).

In the case where the light diffusing agent is contained in the light control sheet 11 in contrast to the above, incident light from the point light sources 10 is further scattered and enters the light control sheet 12, so that the return light generating capability of the light control sheet 12 may be necessary to be further increased. However, improvement in the return light generating capability is limited. It is therefore necessary to add a diffusion sheet and densely dispose the point light sources 10. In such a case, reduction in thickness and saving of lighting of the illuminating apparatus 1 is disturbed. Therefore, it may be unpreferable to make the light diffusing agent contained in the light control sheet 11, from the viewpoint of reduction in thickness and saving of lighting of the illuminating apparatus 1.

Figure 4:
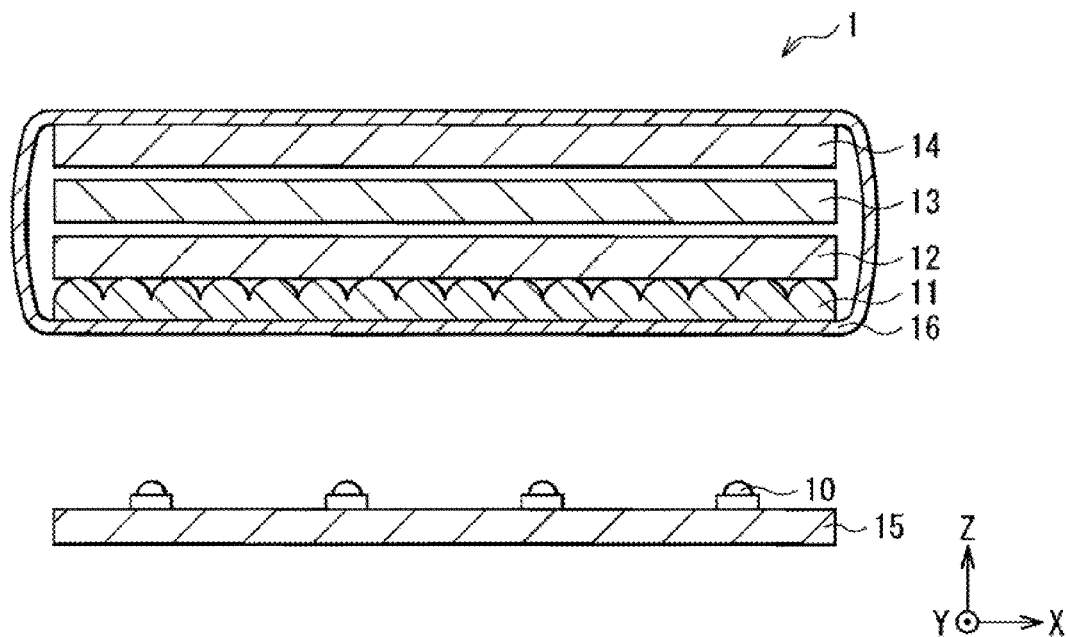
FIG. 4 is a cross section showing a first modification of the illuminating apparatus of FIG. 1.

Generally, brightness unevenness in the plane occurs when P3/H or P4/H is increased. There are two cases that P3/H or P4/H increases; a case where distance H between the point light sources 10 and the light control sheet 11 is narrowed to reduce thickness, and a case where the number of point light sources 10 is decreased (the pitches P3 and P4 of the point light sources 10 are decreased) to save lighting. The display apparatus of the embodiment is suitable for any of the cases.
Modifications In the foregoing embodiment, various optical sheets disposed over the point light sources 10 (for example, the light control sheets 11 and 12, the diffusion member 13, and the prism sheet 14) are not covered. In the case where a relatively thick diffusion plate is used as the diffusion member 13 and the diffusion member 13 is used as a supporting member, for example, as shown in FIG. 4, the various optical elements may be covered with a covering member 16. In this case, even when expanding amounts of the various optical sheets over the point light sources 10 vary from each other according temperature changes, without causing wrinkles in the optical sheets, the various optical sheets may be held in the casing (not shown) of the illuminating apparatus 1. In the case where the light control sheets 11 and 12 are disposed between the rear face (the face on the side of the point light sources 10) of the diffusion member 13 and the covering member 16 as shown in FIG. 4, it may be unnecessary to increase the rigidity of the light control sheets 11 and 12 to prevent warpage and deflection. Consequently, the light control sheets 11 and 12 may be thinned to the same degree as that in the case where the light control sheets 11 and 12 are provided on the top face of the diffusion member 13. With the configuration, even in the case where the light control sheets 11 and 12 are provided just below the diffusion member 13, the illuminating apparatus 1 may be thinned.

Figure 5:
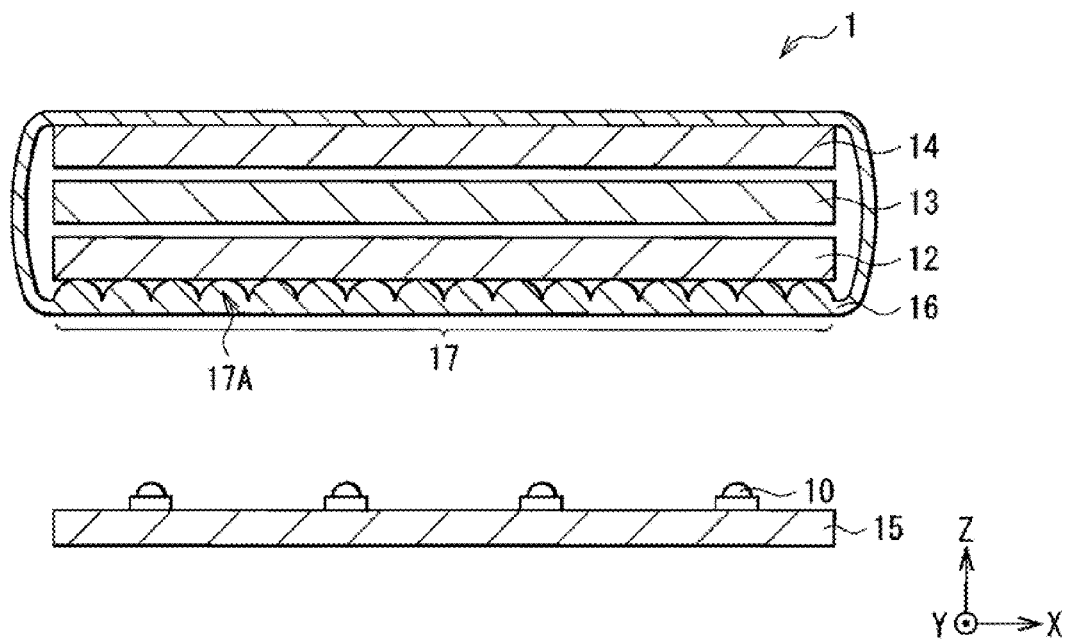
FIG. 5 is a cross section showing a second modification of the illuminating apparatus of FIG. 1.

Further, as shown in FIG. 5, projections 17A having a characteristic similar to that of the projections 11A of the light control sheet 11 may be provided on the light-incident-side region in the covering member 16. By providing an light control part 17 having the projections 17A in place of the light control sheet 11, in the light-incident-side region in the covering member 16, the illuminating apparatus 1 may be further thinned.

Figure 6:
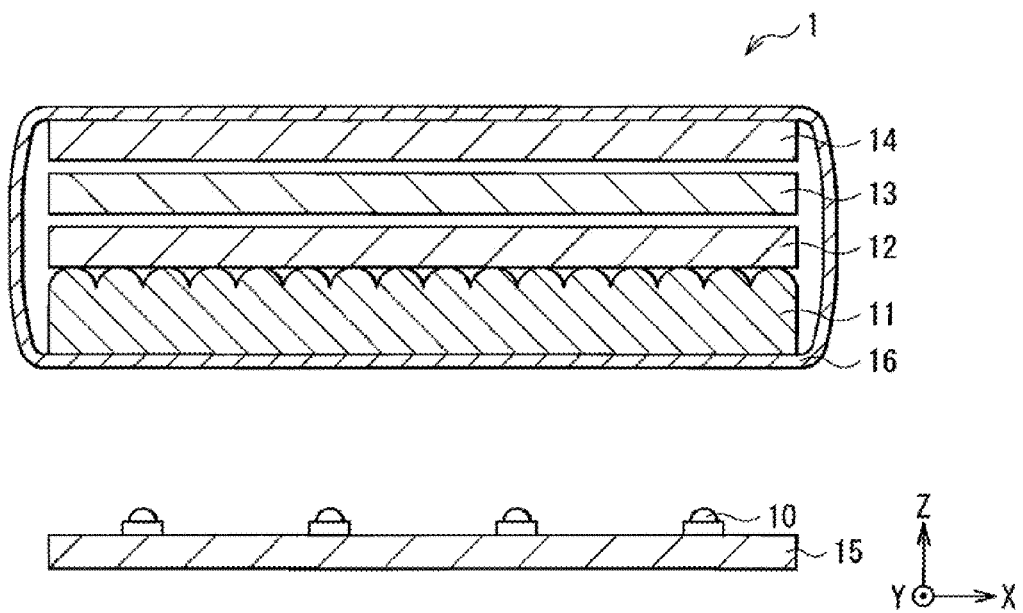
FIG. 6 is a cross section showing a third modification of the illuminating apparatus of FIG. 1.
Figure 7:
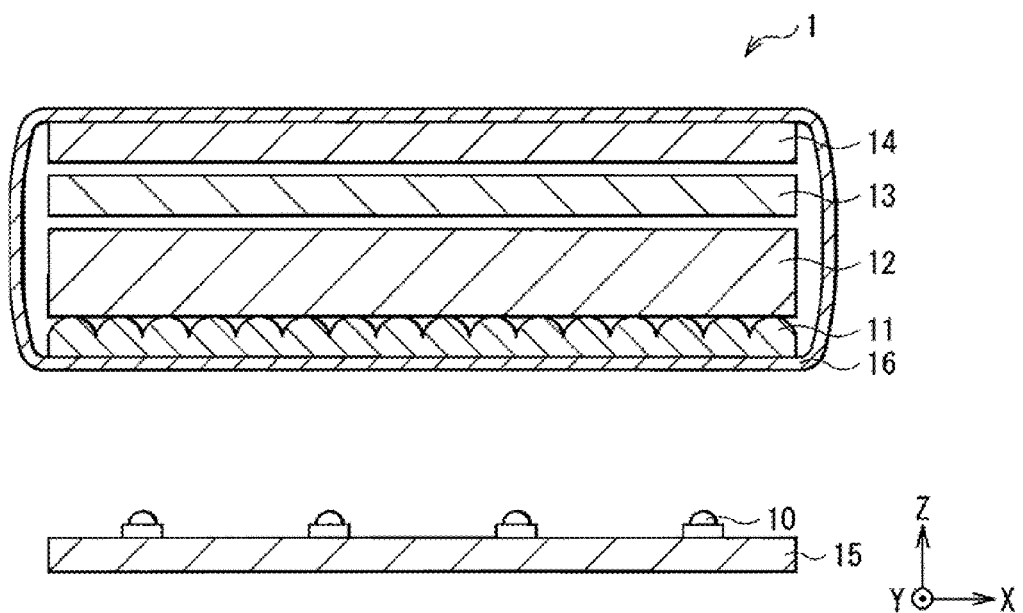
FIG. 7 is a cross section showing a fourth modification of the illuminating apparatus of FIG. 1.
Figure 8:
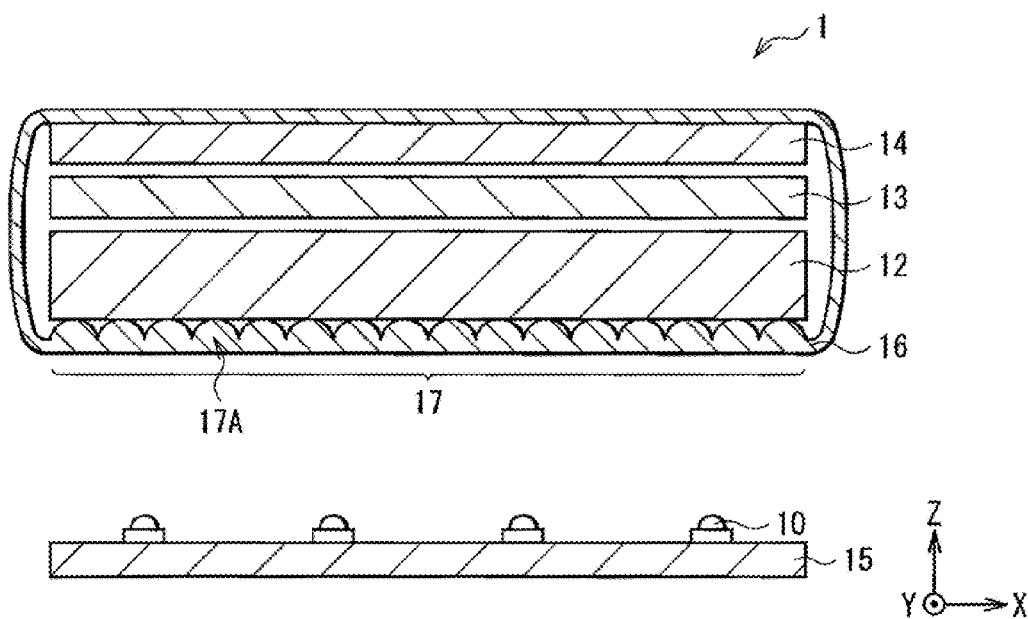
FIG. 8 is a cross section showing a fifth modification of the illuminating apparatus of FIG. 1.

For example, the light control sheet 11 may be thickened to have rigidity and used as a supporting member as shown in FIG. 6, or the light control sheet 12 may be thickened to have rigidity and used as a supporting member as shown in FIGS. 7 and 8. In the case of using the light control sheet 11 or 12 as a supporting member, the diffusion member 13 may not have to be a diffusion plate functioning as the supporting member, but may be a thin diffusion sheet. In the case where the diffusion member 13 is a thin diffusion sheet, it is preferable to strengthen the diffusivity by making a filler contained in the light control sheet 12.

Figure 9:
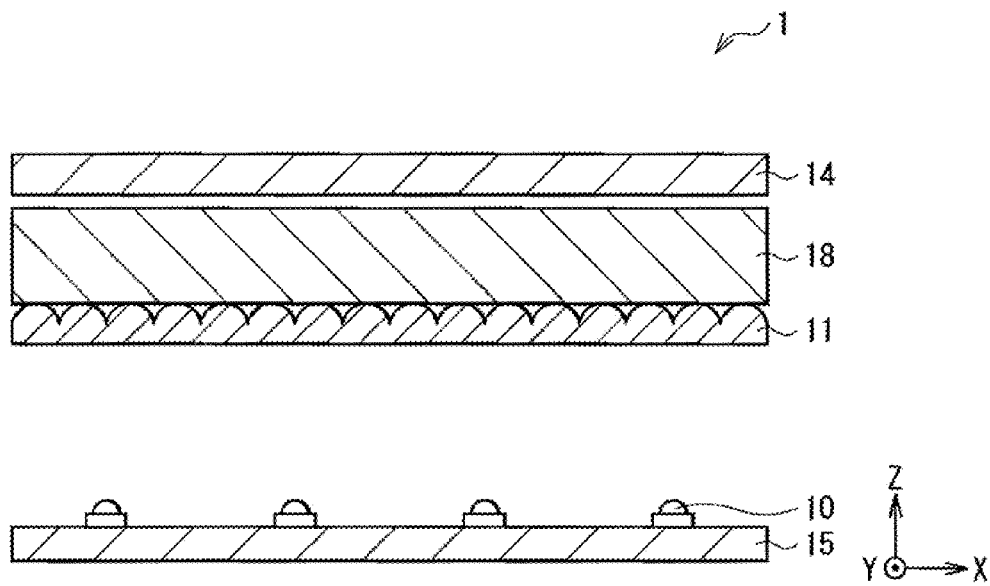
FIG. 9 is a cross section showing a sixth modification of the illuminating apparatus of FIG. 1.
Figure 10:
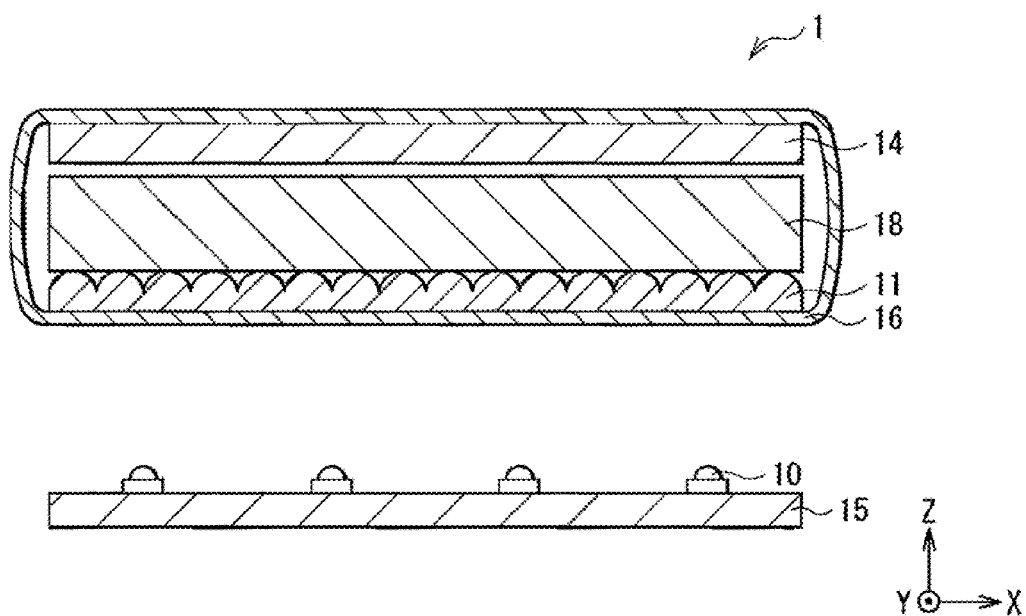
FIG. 10 is a cross section showing a seventh modification of the illuminating apparatus of FIG. 1.
Figure 11:
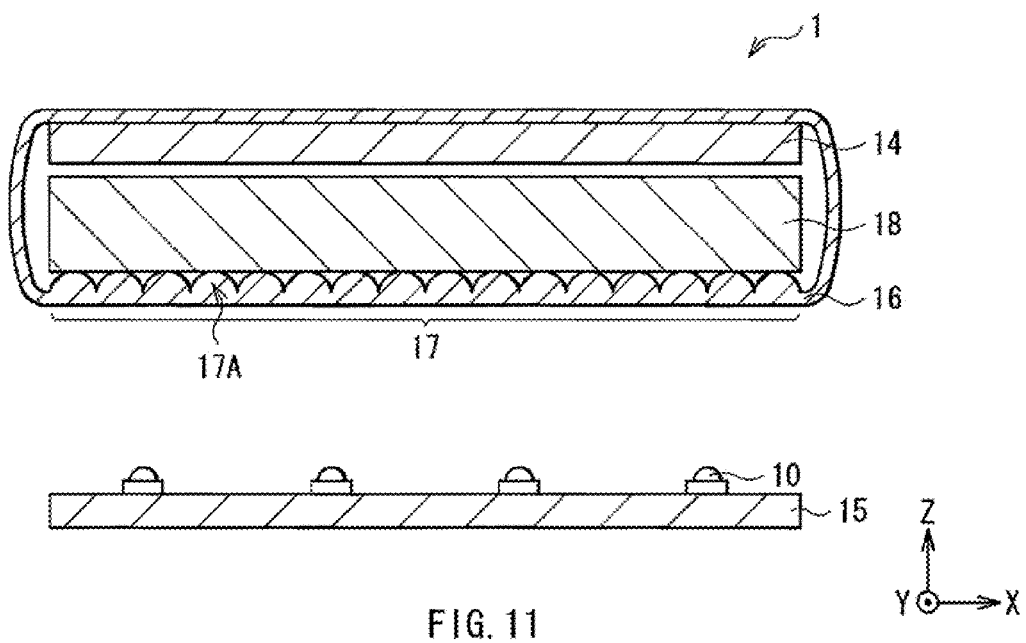
FIG. 11 is a cross section showing an eighth modification of the illuminating apparatus of FIG. 1.

For example, as shown in FIGS. 9 and 10, in place of the light control sheet 12 and the diffusion member 13, a light control sheet 18 in which the light control sheet 12 and the diffusion member 13 are integrally formed may be provided on the top face of the light control sheet 11. For example, as shown in FIG. 11, in place of the light control sheet 12 and the diffusion member 13, the light control sheet 18 in which the light control sheet 12 and the diffusion member 13 are integrally formed may be provided in contact with the light control part 17 in the covering member 16. The light control sheet 18 may be manufactured by adhering the light control sheet 12 on the top face of the diffusion member 13, or by forming a three-dimensional structure having the same shape as the projections 12A in the light control sheet 12 in the top face of the diffusion member 13 at the time of forming the diffusion member 13. In the case where the light control sheet 18 does not have high diffusivity, it is preferable to provide a diffusion sheet between the light control sheet 18 and the prism sheet 14.

Examples

Next, examples of the illuminating apparatus 1 of the embodiment will be described.

FIGS. 12, 13, and 14 show measurement results of brightness unevenness and determination of samples 1 to 34 obtained by changing the combinations of the configurations of the light control sheets 11 and 12 in the illuminating apparatus 1 and the distance H between the point light sources 10 and the light control sheet 11.

Figures 15, 16:
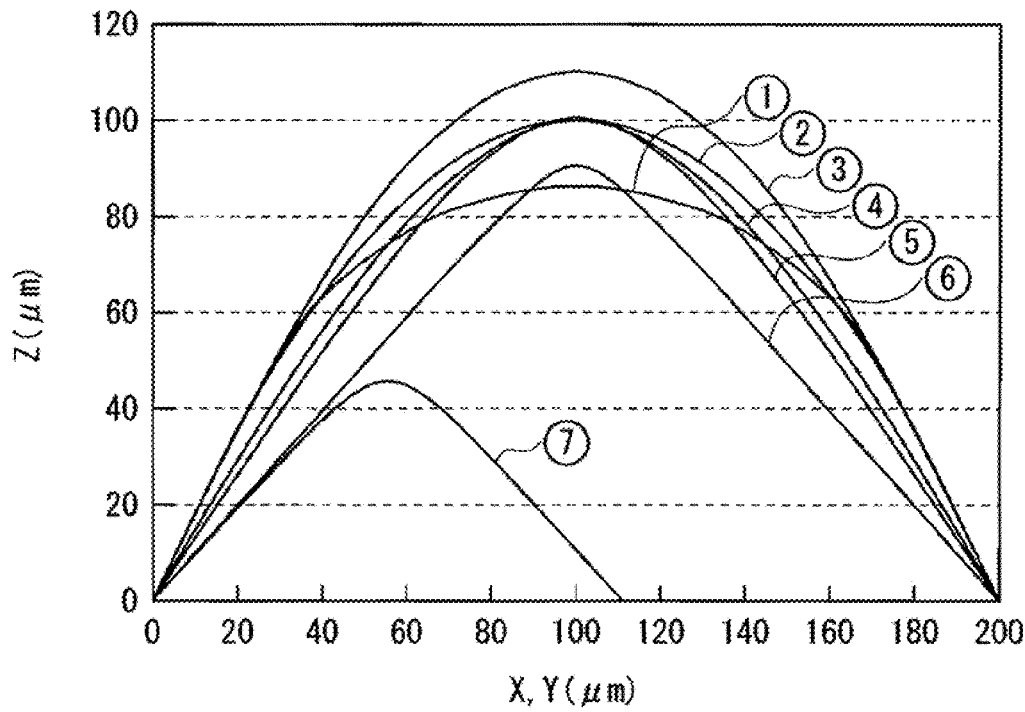
FIG. 15 is a cross section showing sectional shapes of projections 11A and 12A in examples.
FIG. 16 is a correspondence diagram showing the configuration of a filler in each of the examples and total luminous transmittance [%] (JIS K 7361) corresponding to the configuration.

The samples 1 to 34 were manufactured by disposing, over the point light sources 10, the light control sheets 11 and 12, the diffusion member 13, the prism sheet 14, and a reflection-type polarization separation element 15 in order from the point light sources 10 side, and disposing the reflection sheet 15 on the rear face of the point light sources 10. In the samples 1 to 12 shown in FIG. 12, white LEDs were used as the point light sources 10, and each of the pitches P3 and P4 was set to 30 mm. In the samples 13 to 24 shown in FIG. 13, LEDs generating light of three primary colors of R, G, and B separately were used as the point light sources 10, and each of the pitches P3 and P4 was set to 40 mm. In the samples 1 to 24, a filler was not added to each of the light control sheets 11 and 12 and a diffusion plate having total luminous transmittance of about 80% was used as the diffusion member 13. In the samples 25 to 34 shown in FIG. 14, LEDs generating light of three primary colors of R, G, and B separately were used as the point light sources 10, and each of the pitches P3 and P4 was set to 40 mm. In the samples 25 to 34, a filler was not added to the light control sheet 11 but a filler was added to the light control sheet 12, and a diffusion sheet was used as the diffusion member 13. In the samples 1 to 34, as the projections 11A and 12A of the light control sheets 11 and 12, projections having sectional shapes as shown in FIG. 15 were selected. As the diffusion member 13, a diffusion member having total luminous transmittance of about 80% was used. In the samples 24 to 34, as a filler to be added to the light control sheet 12, fillers as shown in FIG. 16 were selected.

It is understood from FIG. 12 that, in the case of using the light control sheets 11 and 12 and the diffusion plate, when the relations P3/H>1.3 and P4/H>1.3 are satisfied, no unevenness was seen in the samples 5, 7, 9, and 11 in which Tt1−Tt2 satisfies the relations of 20>Tt1−Tt2>5. When P3/H and P4/H satisfy the relations P3/H<1.3 and P4/H<1.3, respectively, no unevenness was seen even when the shapes of the light control sheets 11 and 12 were not changed. In the samples 5, 7, 9, and 11 in which no unevenness was seen, R2/P2 and R1/P1 satisfy the relations of 0.1≦R2/P2<R1/P1<0.4 and 0.02<R1/P1−R2/P2<0.1.

It was understood from FIG. 13 that, like in FIG. 12, also in the case of using LEDs of three colors as the light sources, the above relations were satisfied. The samples 17, 19, 21, and 23 in which no unevenness was seen satisfy the following relational equation group A or B.

Relational Equation Group A $P3/H > 1.3$ $P4/H > 1.3$ $20 > Tt1 - Tt2 > 5$

Relational Equation Group B $P3/H > 1.3$ $P4/H > 1.3$ $0.1 \leq R2/P2 < R1/P1 < 0.4$ $0.02 < R1/P1 - R2/P2 < 0.1$ It is understood from FIG. 14 that, in the samples 30 to 33 in which no unevenness was seen, in the case of using the light control sheet 11, the light control sheet 12 containing a filler, and the diffusion sheet, when P3/H and P4/H satisfy the relations of P3/H>1.3 and P4/H>1.3, respectively, Tt1−Tt2 satisfies the relations of 20>Tt1−Tt2>5. Similarly, R2/P2 satisfies the relation of R2/P2<0.1. In the case where proper amounts of the diffusing agent to be added to the light control sheet 12 are C, D, E, and F and the same amount of the light diffusing agent is contained in the transparent plate which is formed by using the same resin materials as the optical sheet on the side opposite to the point light sources and which has a thickness of 2 mm and whose both faces are flat, total luminous transmittance Tt' when light is incident normal to the transparent plate to which the light diffusing agent is added has a value in the range of 81% to 87%.

FIG. 17 shows brightness unevenness measurement results and determination, in the samples 1 to 34, in the case where the ridge lines of the projections 14A in the prism sheet 14 are parallel to those of the projections 12A in the light control sheet 12 and the case where they are orthogonal to each other.

It is understood from FIG. 17 that in the case where the ridge lines of the projections 14A in the prism sheet 14 are parallel to those of the projections 12A in the light control sheet 12, there is no brightness unevenness.

FIG. 18 shows total luminous transmittance [%] of diffusion plates 1 to 8, and measurement results of brightness and brightness unevenness and determination when the light control sheets 11 and 12, the diffusion plate, the prism sheet 14, and the reflection-type polarization separation element are disposed on the point light sources 10, in order from the point light sources 10 side and the reflection sheet 15 is disposed on the rear face of the point light sources 10. It is understood from FIG. 18 that, with respect to brightness, the diffusion plates 4 to 8 are superior. When the transmittance of a diffusion plate is 90% (diffusion plate 8), since there is hardly diffuseness, brightness unevenness and color unevenness deteriorate. Therefore, from all of viewpoints of the total luminous transmittance, brightness, and brightness unevenness, the diffusion plates 4 to 7 (having the transmittance of 76% to 85%) are proper.

Application Examples

Next, the case of applying the illuminating apparatus 1 of the embodiment to a display apparatus will be described. In the following, the case of applying the illuminating apparatus 1 having the configuration shown in FIGS. 1 and 6 to a display apparatus will be described. Obviously, the illuminating apparatus 1 having a configuration other than the above may be also applied to a display apparatus.

Figure 19:
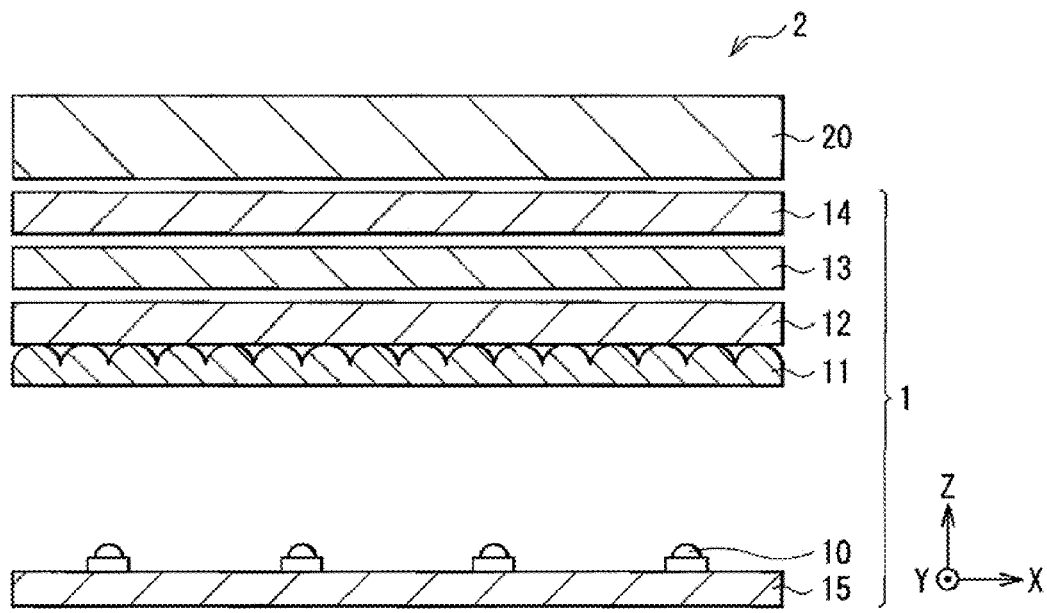
FIG. 19 is a cross section of a display apparatus as an example of applying the illuminating apparatus of FIG. 1.

FIG. 19 shows a sectional configuration of a display apparatus 2 as an application example. The display apparatus 2 has a display panel 20 and the illuminating apparatus 1 in which the prism sheet 14 is disposed so as to be directed toward the display panel 20. The surface of the display panel 20 is directed toward an observer (not shown).

The display panel 20 has a layer stack structure having, although not shown, a liquid crystal layer between a transparent substrate on the observation side and a transparent substrate on the illuminating apparatus 1 side. Concretely, the display panel 20 has, in order from the observation side, a polarization plate, a transparent substrate, a color filter, a transparent electrode, an alignment film, a liquid crystal layer, an alignment film, a transparent pixel electrode, a transparent substrate, and a polarization plate.

The polarization plate is a kind of an optical shutter and transmits only light in a predetermined vibration direction (polarized light). The polarization plates are disposed so that their polarization axes are different from each other by 90 degrees. With the arrangement, light emitted from the illuminating apparatus 1 passes through the liquid crystal layer or is interrupted by the liquid crystal layer. The transparent substrate is a substrate transparent to visible light, for example, a plate glass. In the transparent substrate on the illuminating apparatus 1 side, active drive circuits including a TFT (Thin Film Transistor) as a drive element electrically connected to the transparent pixel electrode, a wire and the like are formed. The color filer is constructed by arranging color filers for separating light emitted from the illuminating apparatus 1 to, for example, three primary colors of R, G, and B. The transparent electrode is made of, for example, ITO (Indium Tin Oxide) and functions as a common opposite electrode. The alignment film is made of, for example, a high polymer material such as polyimide, and performs an alignment process on the liquid crystal. The liquid crystal layer is made of, for example, liquid crystal in the VA (Vertical Alignment) mode, a TN (Twisted Nematic) mode, or an STN (Super Twisted Nematic) mode, and has a function of passing or interrupting light emitted from the illuminating apparatus 1 pixel by pixel by voltage applied from the drive circuit. The transparent pixel electrode is made of, for example, ITO and functions as an electrode of a pixel.

Next, the action in the display apparatus 2 will be described. Light emitted from each of the point light sources 10 in the illuminating apparatus 1 is adjusted to light having desired on-axis brightness, an in-plane brightness uniformity, a view angle, or the like. After that, the rear face of the display panel 20 is illuminated with the adjusted light. The light emitted to the rear face of the display panel 20 is modulated by the display panel 20, and the resultant light is emitted as image light from the surface of the display panel 20 to the observer side.

In the display apparatus 2, the equations (1) to (5) are satisfied in the light control sheets 11 and 12 in the illuminating apparatus 1, so that the brightness unevenness and color unevenness of illumination light with which the rear face of the display panel 20 is illuminated is reduced. Thus, the display apparatus 2 having high display quality may be provided.

Figure 20:
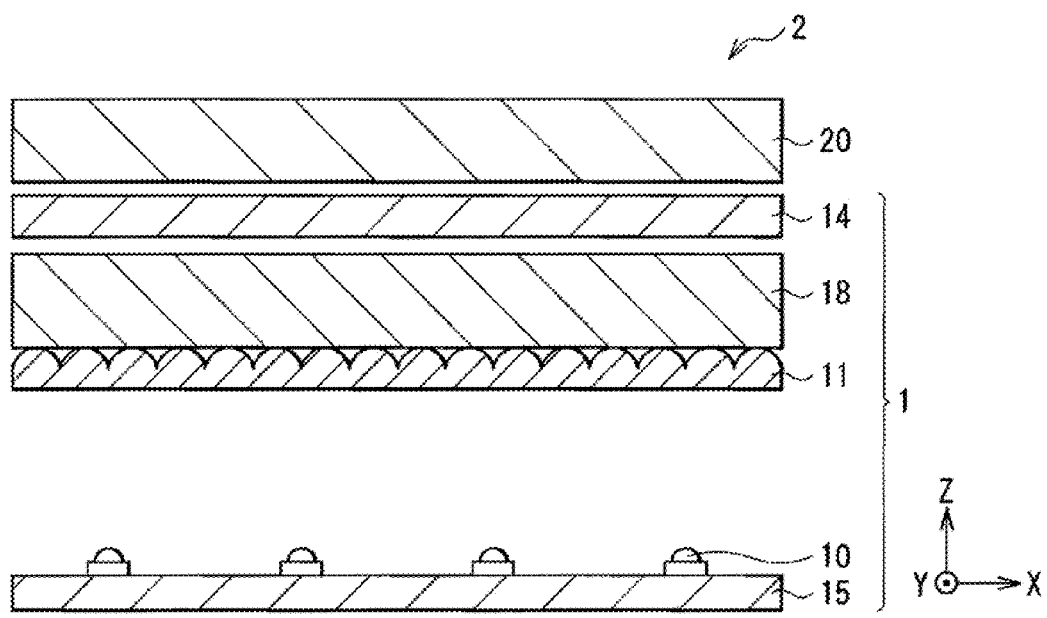
FIG. 20 is a cross section of a display apparatus as an example of applying the illuminating apparatus of FIG. 9.

As shown in FIG. 20, in the display apparatus 2, an apparatus obtained by providing the light control sheet 18 in which the light control sheet 12 and the diffusion member 13 are integrally formed on the top face of the light control sheet 11 in place of the light control sheet 12 and the diffusion member 13 may be used as an illuminating apparatus.

In the embodiments, in the illuminating apparatus 1 and the display apparatus 2, the light control sheets 11 and 12, the diffusion member 13, and the prism sheet 14 have been described as the various optical sheets included in the illuminating apparatus 1. As necessary, another optical sheet may be included in the illuminating apparatus 1, or any of the optical sheets may be eliminated.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An illuminating apparatus comprising:
a plurality of point light sources in one plane, wherein the point light sources are light emitting diodes (LEDs); and
two optical sheets overlapped in a region facing the plurality of point light sources,
wherein the plurality of point light sources are arranged in a first direction and also arranged in a second direction orthogonal to the first direction,
the optical sheet on a side of the point light sources has a plurality of first three-dimensional structures extending in a direction parallel to the first direction and arranged in a direction parallel to the second direction,
the optical sheet on a side opposite to the point light sources has a plurality of second three-dimensional structures extending in a direction parallel to the second direction and arranged in a direction parallel to the first direction, and
each of the second three-dimensional structures has a shape which generates a larger amount of return light from normal incident light as compared with the first three-dimensional structures, wherein the first and the second three-dimensional structures satisfy the following expressions of $$P3/H > 1.3$$

$$P4/H > 1.3 \text{ and}$$

$$20 > Tt1 - Tt2 > 5$$

where
P3 is the pitch in the first direction of the point light sources,
P4 is the pitch in the second direction of the point light sources,
H is the distance between the point light sources and the optical sheet on the side of the point light sources, Tt1[%] is the total luminous transmittance of the optical sheet on the point light sources side when light is incident normal to the optical sheet on the point light sources side from the point light sources side, and Tt2[%] is the total luminous transmittance of the optical sheet on the side opposite to the point light sources when light is incident normal to the optical sheet on the side opposite to the point light sources from the point light sources side.

2. The illuminating apparatus according to claim 1, wherein the first three-dimensional structure has a first apex part extending in a direction parallel to the first direction and a pair of first tilted surfaces on both sides of the first apex part, and the second three-dimensional structure has a second apex part extending in a direction parallel to the second direction and a pair of second tilted surfaces on both sides of the second apex part.

3. The illuminating apparatus according to claim 2, wherein the surface of each of the first and the second apex parts has a protruded curvature surface projected toward the light outgoing side, and each of the first and the second tilted surfaces is a flat surface.

4. The illuminating apparatus according to claim 3, wherein when an angle formed between a tangent line, which is in contact with the first apex part and the first tilted surface, and the one plane is $\phi 1$ and an angle formed between a tangent line, which is in contact with the second apex part and the second tilted surface, and the one plane is $\phi 2$, $\phi 1$ smoothly increases from the first apex part toward the first tilted surface, and $\phi 2$ smoothly increases from the second apex part toward the second tilted surface.

5. The illuminating apparatus according to claim 2, wherein a height of the first apex part is larger than a height of the second apex part.

6. The illuminating apparatus according to claim 1, further comprising a diffusion plate on the optical sheet on the side opposite to the point light sources.

7. The illuminating apparatus according to claim 6, wherein the first and the second three-dimensional structures satisfy the following expressions of $$0.1 \leq R2/P2 < R1/P1 < 0.4 \text{ and}$$

$$0.02 < R1/P1 - R2/P2 < 0.1$$

where
P3 is the pitch in the first direction of the point light sources,
P4 is the pitch in the second direction of the point light sources,
R1 is the curvature of the apex part of the first three-dimensional structure, and
R2 is the curvature of the apex part of the second three-dimensional structure.

8. The illuminating apparatus according to claim 6, wherein transmittance of the diffusion plate lies in the range of 76% to 85%.

9. The illuminating apparatus according to claim 1, wherein the optical sheet on the side opposite to the point light sources contains a light diffusing agent.

10. The illuminating apparatus according to claim 9, wherein an additive amount of the light diffusing agent contained in the optical sheet on the side opposite to the point light sources is set to a value at which, in the case of adding the same amount of the light diffusing agent into a transparent plate which is formed by using the same resin materials as the optical sheet on the side opposite to the point light sources and which has a thickness of 2 mm and whose both surfaces are flat, total luminous transmittance when light is incident normal to the transparent plate to which the light diffusing agent is added, lies in the range of 81% to 87%.

11. The illuminating apparatus according to claim 9, wherein the second three-dimensional structure satisfies an expression of $$R2/P2 < 0.1$$

where
P2 is the pitch in the arrangement direction of the plurality of second three-dimensional structures, and
R2 is the curvature of an apex part of the second three-dimensional structure.

12. The illuminating apparatus according to claim 1, further comprising a brightness improving film on the optical sheet on the side opposite to the point light sources,
wherein the brightness improving film has a plurality of third three-dimensional structures extending in a direction parallel to the second direction and arranged in a direction parallel to the first direction.

13. The illuminating apparatus according to claim 1, further comprising a covering member covering the two optical sheets.

14. The illuminating apparatus according to claim 1, further comprising a covering member covering the optical sheet on the side opposite to the point light sources,
wherein a light incident region on which light from the point light sources is incident, in the covering member serves as the optical sheet on the point light sources side.

15. The illuminating apparatus according to claim 14, wherein the optical sheet on the side opposite to the point light sources functions as a supporting member that supports the optical sheet on the point light source side.

16. A display apparatus comprising:
a display panel driven on the basis of an image signal; and
an illuminating apparatus illuminating the display panel,
wherein the illuminating apparatus includes:
a plurality of point light sources in one plane, wherein the point light sources are light emitting diodes (LEDs); and
two optical sheets overlapped in a region facing the plurality of point light sources,
the plurality of point light sources are arranged in a first direction and also arranged in a second direction orthogonal to the first direction,
the optical sheet on a side of the point light sources has a plurality of first three-dimensional structures extending in a direction parallel to the first direction and arranged in a direction parallel to the second direction,
the optical sheet on a side opposite to the point light sources has a plurality of second three-dimensional structures extending in a direction parallel to the second direction and arranged in a direction parallel to the first direction, and
each of the second three-dimensional structures has a shape which generates a larger amount of return light from normal incident light as compared with the first three-dimensional structures, wherein the first and the second three-dimensional structures satisfy the following expressions of $$P3/H > 1.3$$

$$P4/H > 1.3 \text{ and}$$

$$20 > Tt1 - Tt2 > 5$$

where
- P3 is the pitch in the first direction of the point light sources,
- P4 is the pitch in the second direction of the point light sources,
- H is the distance between the point light sources and the optical sheet on the side of the point light sources,
- Tt1[%] is the total luminous transmittance of the optical sheet on the point light sources side when light is incident normal to the optical sheet on the point light sources side from the point light sources side, and
- Tt2[%] is the total luminous transmittance of the optical sheet on the side opposite to the point light sources when light is incident normal to the optical sheet on the side opposite to the point light sources from the point light sources side.

* * * * *